US006181747B1

(12) United States Patent
Burns

(10) Patent No.: US 6,181,747 B1
(45) Date of Patent: *Jan. 30, 2001

(54) METHODS AND SYSTEMS FOR HIGH COMPRESSION RATE ENCODING AND DECODING OF QUASI-STABLE OBJECTS IN VIDEO AND FILM

(75) Inventor: Ronnie R. Burns, Irvine, CA (US)

(73) Assignee: Hughes Electronics Corporation, El Segundo, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/595,321

(22) Filed: Feb. 1, 1996

(51) Int. Cl.[7] ................................................. G06K 9/00
(52) U.S. Cl. ............................................... 375/240.9
(58) Field of Search ................................... 348/397, 403, 348/414, 415, 416, 699, 413, 26, 625; 382/166, 276; 375/240.9

(56) References Cited

U.S. PATENT DOCUMENTS

| | | | |
|---|---|---|---|
| 4,196,448 | 4/1980 | Whitehouse et al. | 348/400 |
| 4,454,546 | 6/1984 | Mori | 348/409 |
| 4,809,083 | 2/1989 | Nagano et al. | 382/299 |
| 4,809,350 | 2/1989 | Shimoni et al. | 348/409 |
| 5,063,524 | 11/1991 | Ferre et al. | 382/107 |
| 5,109,451 | * 4/1992 | Aono et al. | 382/166 |
| 5,136,659 | * 8/1992 | Kaneko et al. | 382/190 |
| 5,182,642 | 1/1993 | Gersdorff et al. | 348/388 |
| 5,376,971 | * 12/1994 | Kadono et al. | 348/699 |
| 5,442,458 | * 8/1995 | Rabbani et al. | 358/426 |
| 5,461,680 | * 10/1995 | Davis | 382/276 |
| 5,495,539 | 2/1996 | Sieverding | 382/276 |
| 5,546,129 | * 8/1996 | Lee | 348/416 |
| 5,581,308 | * 12/1996 | Lee | 348/699 |
| 5,590,261 | * 12/1996 | Sclaroff et al. | 395/173 |
| 5,654,761 | * 8/1997 | Jung | 348/416 |
| 5,940,129 | * 8/1999 | Burns | 348/403 |

OTHER PUBLICATIONS

Huang, et al., A New Motion Compensation Method for Image Sequence Coding Using Hierarchical Grid Interpolation, IEEE ToCaSfVt, vol. 4, No. 1, pp. 42–51, Feb. 1994.*

* cited by examiner

*Primary Examiner*—Chris Kelley
*Assistant Examiner*—Allen Wong
(74) *Attorney, Agent, or Firm*—John A. Crook; Michael W. Sales

(57) ABSTRACT

Methods and systems for encoding a video signal representative of a plurality of image frames which include a starting frame and at least one subsequent frame, include a step of identifying at least one object in the image frames. A plurality of feature points of the at least one object are located in the image frames. A mathematical transformation which maps locations of the feature points in the starting frame to locations in each subsequent frame is determined. The bit plane representation of the starting frame and the mathematical transformation are encoded and multiplexed to form a bit stream. Methods and systems for decoding the bit stream perform a step of transforming the bit plane representation of the starting frame in accordance with the mathematical transformation to form a bit plane representation for each subsequent frame.

32 Claims, 3 Drawing Sheets

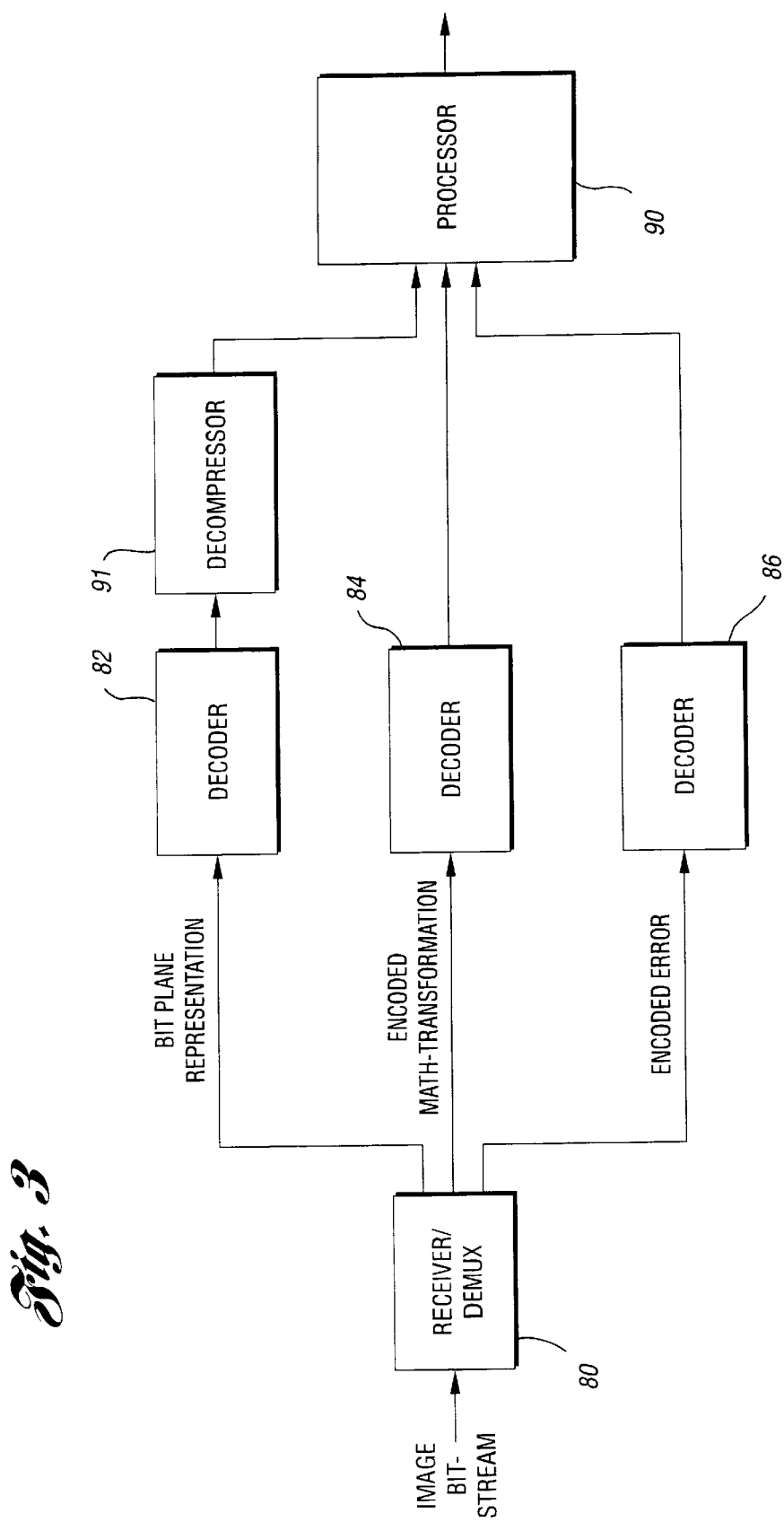

METHODS AND SYSTEMS FOR HIGH COMPRESSION RATE ENCODING AND DECODING OF QUASI-STABLE OBJECTS IN VIDEO AND FILM

TECHNICAL FIELD

The present invention relates to methods and systems for encoding and decoding digital video data.

BACKGROUND ART

Video compression systems are employed to reduce the number of bits needed to transmit and store a digital video signal. As a result, a lower bandwidth communication channel can be employed to transmit a compressed video signal in comparison to an uncompressed video signal. Similarly, a reduced capacity of a storage device, which can comprise a memory or a magnetic storage medium, is required for storing the compressed video signal. A general video compression system includes an encoder, which converts the video signal into a compressed signal, and a decoder, which reconstructs the video signal based upon the compressed signal.

In the design of a video compression system, an objective is to reduce the number of bits needed to represent the video signal while preserving its visual content. Current methods and systems for video compression have achieved a reasonable quality of content preservation at a transmission bit rate of 56 kilobits per second. These methods and systems are based upon directly compressing a waveform representation of the video signal.

Motion compensation is one approach which is utilized in many video compression schemes. Current approaches model motion in terms of simple displacements of blocks or a global transformation of an entire scene to model camera motion.

SUMMARY OF THE INVENTION

The need exists for a video compression system which significantly reduces the number of bits needed to transmit and store a video signal, and which simultaneously preserves the visual content of the video signal.

It is thus an object of the present invention to significantly reduce the bit rate needed to transmit a video signal.

Another object of the present invention is to provide an efficient encoding of redundant temporal data contained within a digital video signal.

In carrying out the above objects, the present invention provides a method of encoding a video signal representative of a plurality of image frames. The plurality of image frames includes a starting frame and at least one subsequent frame. The method includes steps of identifying at least one object in the image frames, and locating a plurality of feature points of the at least one object. A step of determining a mathematical transformation which maps locations of the feature points in the starting frame to locations in each of the at least one subsequent frame is performed. The method also includes steps of encoding the mathematical transformation and a bit plane representation of the starting frame.

Further, in carrying out the above objects, the present invention provides a method of decoding an encoded representation of a plurality of image frames. The plurality of image frames includes a starting frame and at least one subsequent frame. The method includes a step of receiving an encoded signal containing an encoded bit plane representation for the starting frame and an encoded mathematical transformation. A step of decoding the encoded bit plane representation is performed to extract a bit plane representation for the starting frame. A step of decoding the encoded mathematical transformation is performed to extract a mathematical transformation which maps locations of feature points in the starting frame to locations in each of the at least one subsequent frame. A step of transforming the bit plane representation of the starting frame in accordance with the mathematical transformation is performed to form a bit plane representation for each subsequent frame.

Further in carrying out the above objects, systems are provided which perform the steps of the above-described methods.

Embodiments of the present invention advantageously produce high compression rates for coding small object motions or deformations in video and film digital data. A practical temporal description of quasi-rigid, as well as rigid body motion for generic objects that are constant during a sequence of interest, i.e., objects which are neither created nor destroyed during the sequence being coded, is provided. The motion is based on actual object deformation rather than artificial motion descriptions based on arbitrary block matching techniques. This approach complements methods that provide a global description of camera motions such as zoom and pan.

These and other features, aspects, and embodiments of the present invention will become better understood with regard to the following description, appended claims, and accompanying drawings.

BRIEF DESCRIPTION OF THE DRAWINGS

FIG. 3 is a block diagram of a system for decoding a bit stream representative of a plurality of image frames.

BEST MODES FOR CARRYING OUT THE INVENTION

Figure 1:
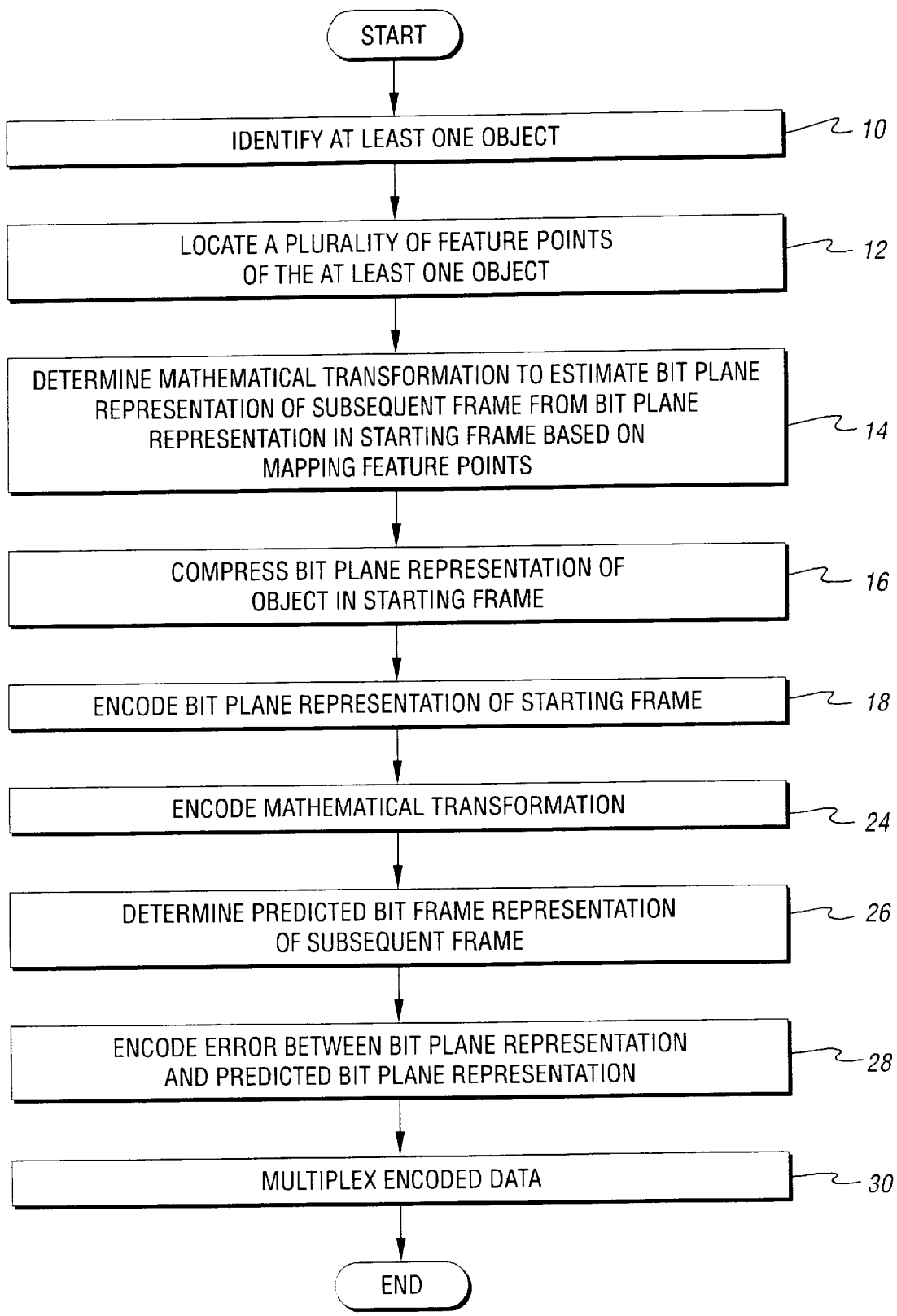
FIG. 1 is a flow diagram of an embodiment of a method of encoding a video signal representative of a plurality of image frames.

Referring to FIG. 1, there is shown a flow diagram of an embodiment of a method of encoding a video signal representative of a plurality of image frames. The plurality of image frames includes a starting frame and at least one subsequent frame. The at least one subsequent frame may be either sequentially forward (i.e. forward in time) from the starting frame, or sequentially backward (i.e. backward in time) from the starting frame.

As indicated by block 10, the method includes a step of identifying at least one object in the image frames. The at least one object can be identified using object identification methods known in the art of image processing. Many object identification methods include a step of segmenting the image frames, i.e., subdividing each image frame into at least one object. For the purpose of this application, an object of an image frame can be representative of a constituent part of the image frame, a region of the image frame, or another entity of interest in the image frame.

As indicated by block 12, step of locating a plurality of feature points of the at least one object identified in block 10 is performed. A step of determining a mathematical transformation which maps locations of the feature points in the starting frame to locations in each of the at least one subsequent frame is performed as indicated by block 14. In effect, the mathematical transformation estimates a bit plane representation of each of the at least one subsequent frame from a bit plane representation of the starting frame. Consequently, the mathematical transformation maps picture element points in the starting frame to their new location in each of the at least one subsequent frame. The feature points and the mathematical transformation can be determined on a frame-to-frame basis, and hence the delay of encoding the video signal can be very low.

Alternatively, the mathematical transformation can also be based upon a bit plane representation of an ending frame. In particular, the mathematical transformation maps the locations of the feature points in the ending frame to locations in each of at least one previous frame.

In general, different types of mathematical transformations may be utilized. For example, the mathematical transformation may be based upon a motion vector representative of translational motion between the starting frame and a subsequent frame. For translational motion of a rigid object, the mathematical transformation would consist of a single motion vector. Alternatively, the mathematical transformation can include an affine transformation representative of a zooming and a panning between the starting frame and the subsequent frame.

As a further alternative, the mathematical transformation can be a morphing transformation based upon the feature points. Here, the feature points are identified for the at least one object in at least the starting frame and a subsequent frame. A mapping of some number of chosen feature points is calculated to smoothly transform the image from the starting frame to an intermediate frame. The mapping may be either linear or non-linear. The synthesized set of object images can be generated by an interpolation transforming the original images to each of the new image times that can correspond to the subsequent original frame times. However, an advantage of this approach is that the new image times do not necessarily have to correspond to the original frame times.

As indicated by block 16, an optional step of compressing the bit plane representation of the starting frame is performed. This step may be performed prior to a step of encoding the bit plane representation of the starting frame, as indicated by block 18. Various compression and encoding schemes known in the art of image processing may be utilized in these steps.

As indicated by block 24, a step of encoding the mathematical transformation is performed. This step typically entails encoding one or more formulae and/or parameters. Hence, a sequence of frames can be described by an encoded original frame along with the encoded mathematical transformation. A high compression ratio is achieved because of the reduced number of bits required to encode a mathematical formula in comparison to encoding detailed pixel data.

The realism of any subsequent frame can be increased and the coding error reduced to any level by determining an error signal between the original intermediate frame and a predicted subsequent frame. Here, an optional step of determining a predicted bit plane representation of a subsequent frame is performed as indicated by block 26. The predicted bit plane representation is determined using the mathematical transform and the bit plane representation of the starting frame. Further, a step of encoding an error between the bit plane representation of the subsequent frame and the predicted bit plane representation is performed, as indicated by block 28.

All of the encoded data for an object is multiplexed to form a bit stream, as indicated by the step in block 30. The bit stream can be either transmitted to a remote location or stored in a storage device for decoding by a corresponding decoder.

The above-described steps can be repeated for a second plurality of image frames, subsequent to the plurality of image frames which were encoded, to form a second bit stream. Consequently, an entire video sequence can be encoded by dividing the video sequence into a plurality of image frame sets, and encoding each image frame set in accordance with the above-described method.

Figure 2:
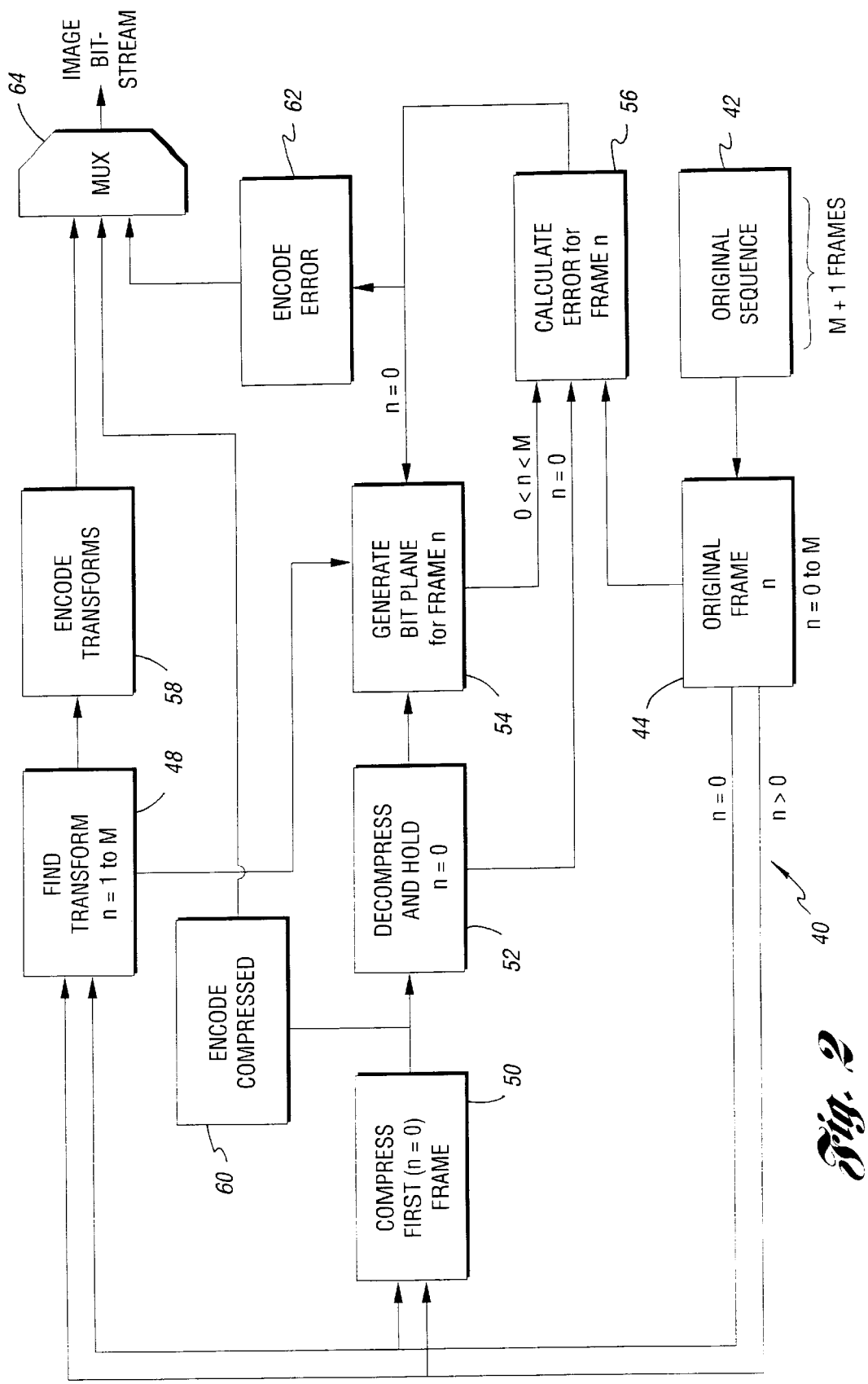
FIG. 2 is a block diagram of a video compression system in accordance with an embodiment of the present invention.

FIG. 2 is a block diagram of a video compression system in accordance with an embodiment of the present invention. The video compression system includes an image processor 40 which receives a plurality of image frames 42 indexed from frame N (the starting frame) to frame N+M (an ending frame). For an index n running from 0 to M, an original frame N+n is extracted in block 44.

A mathematical transformation for the intermediate frames is determined based on the original frame N by block 48. As described earlier herein, the mathematical transformation can be formed based upon the location of feature points within the image frames 42.

The original frame N is applied to a compressor 50. The compressed first original frame is decompressed and held by a decompressor 52. A predicted bit plane representation of frame N+n, where 0<n<M, is generated by block 54 based on the mathematical transformation and the decompressed frame N. The error between the predicted bit plane representation and the original bit plane representation of the frame is determined by block 56.

The mathematical transformation is encoded by an encoder 58. The compressed first frame is encoded by an encoder 60. The error is encoded by an encoder 62. The encoders 58, 60, and 62 are applied to a multiplexer 64 which forms a bit stream. The bit stream can be transmitted to a receiver for decoding the bit stream to produce a decoded sequence of images.

After forming the bit stream representative of frames N to N+M, a subsequent plurality of frames starting at frame N+M+1 can be encoded in a similar manner to form a second bit stream. This can be repeated for other subsequent plurality of frames to encode an entire video sequence.

FIG. 3 shows a block diagram of a system for decoding an image bit stream formed using an embodiment of the video compressor of the present invention. The system includes a receiver 80 to receive an encoded signal containing an encoded bit plane representation for the starting frame. The encoded signal further contains an encoded mathematical transformation. Optionally, the encoded signal includes a representation of an error between a bit plane representation of a subsequent frame and a predicted bit plane representation.

A decoder 82 is coupled to the receiver 80 to decode each encoded bit plane representation to extract a bit plane representation for the starting frame. Another decoder 84 decodes the encoded mathematical transformation to extract a mathematical transformation which maps locations of the feature points in the starting frame to locations in each subsequent frame. Optionally, a third decoder 86 decodes an encoded error signal to extract an error signal for one or more of the subsequent frames.

A processor 90 communicates with the decoders 82, 84, and 86. This communication can occur via a decompressor 91 which decompresses the bit plane representation of the starting frame. The processor 90 transforms the bit plane representation of the starting frame in accordance with the mathematical transformation. As a result, a bit plane representation for each is formed. The processor 90 repeatedly transforms the starting frame to form a series of subsequent frames. The processor 90 forms subsequent frames until a new starting frame and/or a new mathematical transformation is received. At this point, the processor 90 forms subsequent frames based on the new starting frame and/or the new mathematical transformation. All subsequent frames which are formed can be displayed for view on a display device.

After forming a bit plane representation of a first subsequent frame, the first subsequent frame can be utilized as a new anchor frame for forming a bit plane representation of a second subsequent frame. Here, the processor 90 transforms the bit plane representation of the first subsequent frame in accordance with the mathematical transformation to form the bit plane representation of the second subsequent frame. This step can be repeated in a chaining manner to produce a plurality of subsequent frames from a single starting frame.

If received, the error signal between the generated subsequent frame and the real subsequent frame can be utilized by the processor 90 to improve the realism of the subsequent frame. The error signal, including one for the original compressed frame, is received in dependence upon available channel bandwidth. Consequently, the error signal allows improvement of the subsequent frame to the extent that the data rate allows transmission of the residual bits.

The above-described embodiments of the present invention have many advantages. By describing rigid or quasi-rigid object motions by means of a transformation which maps a previous frame into the current frame's configuration, embodiments of the present invention provide an efficient encoding method of redundant temporal data in digital video or film data.

By transmitting a representation of one frame along with a mathematical transformation which describes other frames, a high compression ratio is achieved by not having to transmit redundant, detailed pixel data. By transmitting error data between the generated subsequent frame and the real subsequent frame, the realism of the subsequent frame can be improved to the extent that the data rate allows transmission of the residual bits.

Further, embodiments of the present invention allow object data to be reconstructed at any frame subsequent to the starting frame. This allows for conversion of frame rate from the original video signal, if desired.

Embodiments of the present invention are well suited for use in applications such as videoconferencing or information videos having a "talking head" which remains essentially the same during the sequence of interest, and undergoes only small movements and deformations.

It should be noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and broad scope of the appended claims.

What is claimed is:

1. A method of encoding a video signal representative of a plurality of image frames including a starting frame and at least one subsequent frame, the method comprising the steps of:

identifying at least one object in the image frames;

locating a plurality of feature point on the at least one object in the image frames;

determining a mathematical transformation which maps locations of the feature points on the object in the starting frame to locations in each of the at least one subsequent frame;

encoding a bit plane representation of the starting frame so as to form a first component of an encoded video signal; and encoding the mathematical transformation so as to form a second component of said encoded video signal.

2. The method of claim 1 further comprising the step of compressing the bit plane representation of the starting frame prior to its encoding.

3. The method of claim 1 wherein the at least one subsequent frame is sequentially forward from the starting frame.

4. The method of claim 1 wherein the at least one subsequent frame is sequentially backward from the starting frame.

5. The method of claim 1 wherein the mathematical transformation is a morphing transformation based upon the feature points.

6. The method of claim 1 wherein the mathematical transformation includes a motion vector representative of translational motion from the starting frame to the at least one subsequent frame.

7. The method of claim 1 wherein the mathematical transformation includes an affine transformation representative of a zooming and a panning from the starting frame to the at least one subsequent frame.

8. The method of claim 1 further comprising the steps of:

determining a predicted bit plane representation of one subsequent frame of the at least one subsequent frame, the predicted bit plane representation determined using the mathematical transformation; and encoding an error between the bit plane representation of the one subsequent frame and the predicted bit plane representation so as to form a third component of said encoded video signal.

9. A system for encoding a video signal representative of a plurality of image frames, the plurality of image frames including a starting frame and at least one subsequent frame, the system comprising:

an image processor operative to identify at least one object in the image frames and to locate a plurality of feature points on the at least one object in the starting frame, the image processor further operative to determine a mathematical transformation which maps locations of feature points on the object in the starting frame to locations in each of the at least one subsequent frame;

a first encoder operatively associated with the image processor to encode the bit plane representation of the starting frame;

a second encoder operatively associated with the image processor to encode the mathematical transformation; and a multiplexer operatively associated with said first and second encoders for multiplexing the outputs of said first and second encoders so as to form the encoded video signal.

10. The system of claim 9 further comprising a compressor operatively associated with the image processor and the first encoder to compress the bit plane representation of the starting frame prior to its encoding.

11. The system of claim 9 wherein the at least one subsequent frame is sequentially forward from the starting frame.

12. The system of claim 9 wherein the at least one subsequent frame is sequentially backward from the starting frame.

13. The system of claim 9 wherein the mathematical transformation is a morphing transformation based upon the feature points.

14. The system of claim 9 wherein the mathematical transformation includes a motion vector representative of translational motion from the starting frame to the at least one subsequent frame.

15. The system of claim 9 wherein the mathematical transformation includes an affine transformation representative of a zooming and a panning from the starting frame to the at least one subsequent frame.

16. The system of claim 9 wherein the image processor is further operative to determine a predicted bit plane representation of one subsequent frame of the at least one subsequent frame, wherein the predicted bit plane representation is determined using the mathematical transformation; and wherein the image processor is operative to determine an error between the bit plan representation of the one subsequent frame and the predicted bit plane representation, the system further comprising a third encoder for encoding the error, wherein said multiplexer is operatively associated with said third encoder for multiplexing the outputs of said first, said second, and said third encoders so as to form the encoded video signal.

17. A method of decoding an encoded representation of a plurality of image frames, the plurality of image frames including a starting frame and at least one subsequent frame, the method comprising the steps of:
  receiving an encoded signal having first and second components, said first component containing an encoded bit plane representation for the starting frame, and said second component containing an encoded mathematical transformation;
  decoding the first component to extract a bit plane representation for the starting frame;
  decoding the second component to extract a mathematical transformation which maps locations of feature points in the starting frame to locations in each of the at least one subsequent frame; and
  transforming the bit plane representation of the starting frame in accordance with the mathematical transformation to form a bit plane representation for each subsequent frame.

18. The method of claim 17 further comprising the step of transforming the bit plane representation of a first subsequent frame in accordance with the mathematical transformation to form the bit plane representation of a second subsequent frame.

19. The method of claim 17 wherein the at least one subsequent frame is sequentially forward from the starting frame.

20. The method of claim 17 wherein the at least one subsequent frame is sequentially backward from the starting frame.

21. The method of claim 17 wherein the mathematical transformation is a morphing transformation based upon the locations of the feature points in the starting frame and the at least one subsequent frame.

22. The method of claim 17 wherein the mathematical transformation is based upon a motion vector representative of translational motion from the starting frame to the at least one subsequent frame.

23. The method of claim 17 wherein the mathematical transformation includes an affine transformation representative of a zooming and a panning from the starting frame to the at least one subsequent frame.

24. The method of claim 17 further comprising the steps of:
  receiving a representation of an error between the bit plane representation of one subsequent frame of the at least one subsequent frame and a predicted bit plane representation of the one subsequent frame using the mathematical transformation; and
  correcting the transformed bit plane representation for the one subsequent frame based upon the error.

25. A system for decoding an encoded representation of a plurality of image frames, the plurality of image frames including a starting frame and at least one subsequent frame, the system comprising:
  a receiver to receive an encoded signal having first and second components, said first component containing an encoded bit plane representation of the starting frame, said second component containing an encoded mathematical transformation;
  a first decoder which decodes the first component to extract a bit plane representation of the starting frame;
  a second decoder which decodes the second component to extract a mathematical transformation which maps locations in each of the at least one subsequent frame; and
  a processor which transforms the bit plane representation of the starting frame in accordance with the mathematical transformation to form a bit plane representation for each subsequent frame.

26. The system of claim 25 wherein the processor further transforms the bit plane representation of a first subsequent frame in accordance with the mathematical transformation to form the bit plane representation of a second subsequent frame.

27. The system of claim 25 wherein the at least one subsequent frame is sequentially forward from the starting frame.

28. The system of claim 25 wherein the at least one subsequent frame is sequentially backward from the starting frame.

29. The system of claim 25 wherein the mathematical transformation is a morphing transformation based upon the locations of the feature points in the starting frame and the at least one subsequent frame.

30. The system of claim 25 wherein the mathematical transformation is based upon a motion vector representative of translational motion from the starting frame to the at least one subsequent frame.

31. The system of claim 25 wherein the mathematical transformation includes an affine transformation representative of a zooming and a panning from the starting frame to the at least one subsequent frame.

32. The system of claim 25 wherein the receiver further receives a representation of an error between the bit plane representation of one subsequent frame of the at least one subsequent frame and a predicted bit plane representation of the one subsequent frame using the mathematical transformation, and wherein the processor is operative to correct the bit plane representation for the one subsequent frame based upon the error.

* * * * *